US012601835B2

(12) United States Patent
Grard

(10) Patent No.: US 12,601,835 B2
(45) Date of Patent: Apr. 14, 2026

(54) RADAR DETECTION SYSTEM FOR A VEHICLE

(71) Applicant: VALEO VISION, Bobigny (FR)

(72) Inventor: Christophe Grard, Bobigny (FR)

(73) Assignee: Valeo Vision, Bobigny (FR)

( * ) Notice: Subject to any disclaimer, the term of this patent is extended or adjusted under 35 U.S.C. 154(b) by 607 days.

(21) Appl. No.: 18/000,831

(22) PCT Filed: May 31, 2021

(86) PCT No.: PCT/EP2021/064525
§ 371 (c)(1),
(2) Date: Jun. 8, 2023

(87) PCT Pub. No.: WO2021/249806
PCT Pub. Date: Dec. 16, 2021

(65) Prior Publication Data
US 2023/0314601 A1 Oct. 5, 2023

(30) Foreign Application Priority Data
Jun. 9, 2020 (FR) ........................................ 2006019

(51) Int. Cl.
| | |
|---|---|
| *G01S 13/931* | (2020.01) |
| *G01S 7/02* | (2006.01) |
| *H01Q 1/32* | (2006.01) |
| *H01Q 1/42* | (2006.01) |
| *H01Q 5/22* | (2015.01) |

(52) U.S. Cl.
CPC ............ *G01S 13/931* (2013.01); *G01S 7/027* (2021.05); *H01Q 1/3233* (2013.01); *H01Q 1/422* (2013.01); *H01Q 5/22* (2015.01); *G01S 2013/93271* (2020.01); *G01S 2013/93272* (2020.01)

(58) Field of Classification Search
CPC combination set(s) only.
See application file for complete search history.

(56) References Cited

U.S. PATENT DOCUMENTS

2021/0384622 A1* 12/2021 Caruso .............. B29C 45/14688

FOREIGN PATENT DOCUMENTS

| | | |
|---|---|---|
| DE | 102015003207 A1 | 9/2016 |
| DE | 102018111438 A1 | 11/2019 |
| DE | 102018005592 A1 | 1/2020 |
| JP | 2002135030 A | 5/2002 |
| WO | WO-2021018422 A1 * | 2/2021 ............. B44C 1/228 |

OTHER PUBLICATIONS

European Patent Office, International Search Report (with English translation) and Written Opinion of corresponding International Application No. PCT/EP2021/064525, dated Aug. 4, 2021.

* cited by examiner

*Primary Examiner* — Vladimir Magloire

(74) *Attorney, Agent, or Firm* — Valeo Vision

(57) ABSTRACT

The invention relates to a radar detection system for a vehicle, with radar detection system including a radar sensor configured to emit/receive a plurality of radar waves, a lighting element arranged facing the radar sensor and including at least one light source configured to emit light rays, and a plurality of layers including a transparent layer configured to propagate the light rays, with the layers have substantially equal dielectric permittivities.

4 Claims, 3 Drawing Sheets

RADAR DETECTION SYSTEM FOR A VEHICLE

TECHNICAL FIELD

The present invention relates to a radar detection system for a vehicle. It is applied in particular, but without limitation, in motor vehicles.

BACKGROUND OF THE INVENTION

In the field of motor vehicles, one radar detection system 5 for a vehicle that is well known to those skilled in the art, illustrated in FIG. 1, comprises:

a radar sensor 50 configured to transmit/receive a plurality of radar waves S5, a lighting element 51 arranged facing said radar sensor and comprising at least one light source 510 configured to emit light rays, and a plurality of layers 511 including a transparent layer 511a configured to diffuse said light rays. The transparent layer 511a is delimited by two layers 511b and 511c.

One drawback of this prior art is that, when the lighting element 51 is passed through by the radar waves from the radar sensor 50, the various layers 511 of the lighting element interfere with the transmitted radar waves S5. Indeed, the various layers 511 represent different media that the radar waves have to pass through. Each transition from one medium to another causes double reflections, that is to say the radar waves are reflected and then the reflections that are directed in the opposite direction to the radar waves are reflected again. There are thus several series of reflections, illustrated S5' in FIG. 1, of the radar waves S5 from these various layers 511, and from the surface of the radar sensor 50 itself. The radar waves S5' thus reflected mix with the transmitted radar waves S5, thereby interfering with the transmission of said radar waves.

In this context, the present invention aims to propose a radar detection system for a vehicle that makes it possible to solve the drawback mentioned.

SUMMARY OF THE INVENTION

To this end, the invention proposes a radar detection system for a vehicle, said radar detection system comprising:

a radar sensor configured to transmit/receive a plurality of radar waves, a lighting element arranged facing said radar sensor and comprising at least one light source configured to emit light rays, and a plurality of layers including a transparent layer configured to propagate said light rays, characterized in that said layers have substantially equal dielectric permittivities.

According to some non-limiting embodiments, said radar detection system may furthermore comprise one or more additional features taken on their own or in any technically possible combination, from among the following.

According to one non-limiting embodiment, said transparent layer is a light guide.

According to one non-limiting embodiment, said transparent layer is delimited by two layers including a dark layer.

According to one non-limiting embodiment, said dark layer is arranged facing said radar sensor.

According to one non-limiting embodiment, the other layer that delimits said transparent layer is a reflective layer.

According to one non-limiting embodiment, one of the layers other than the transparent layer is configured to produce a pattern.

According to one non-limiting embodiment, the dielectric permittivities of said layers are between 2.4 and 3.5.

According to one non-limiting embodiment, said radar sensor is a millimeter-wave or very-high-frequency or microwave radar sensor.

According to one non-limiting embodiment, said radar sensor operates at a radar frequency of between 76 GHz and 81 GHz.

According to one non-limiting embodiment, said layer that produces a pattern is a reflective layer.

According to one non-limiting embodiment, said transparent layer is an optical element configured to propagate the light rays from said at least one light source and direct them toward another layer.

According to one non-limiting embodiment, said other layer is a reflective layer.

According to one non-limiting embodiment, said transparent layer is composed of transparent polycarbonate, said dark layer is composed of black polycarbonate, and said reflective layer is composed of indium-coated polycarbonate.

BRIEF DESCRIPTION OF DRAWINGS

The invention and the various applications thereof will be better understood upon reading the following description and upon examining the accompanying figures, in which.

DETAILED DESCRIPTION OF THE INVENTION

Elements that are identical in terms of structure or function appearing in various figures retain the same references, unless indicated otherwise.

The radar detection system 1 according to the invention is described with reference to FIGS. 2 to 5. In one non-limiting embodiment, the vehicle 2 is a motor vehicle. The term motor vehicle is understood to mean any type of motorized vehicle. This embodiment is taken as a non-limiting example throughout the remainder of the description. Throughout the remainder of the description, the vehicle 2 is thus otherwise called motor vehicle 2.

Figure 2:
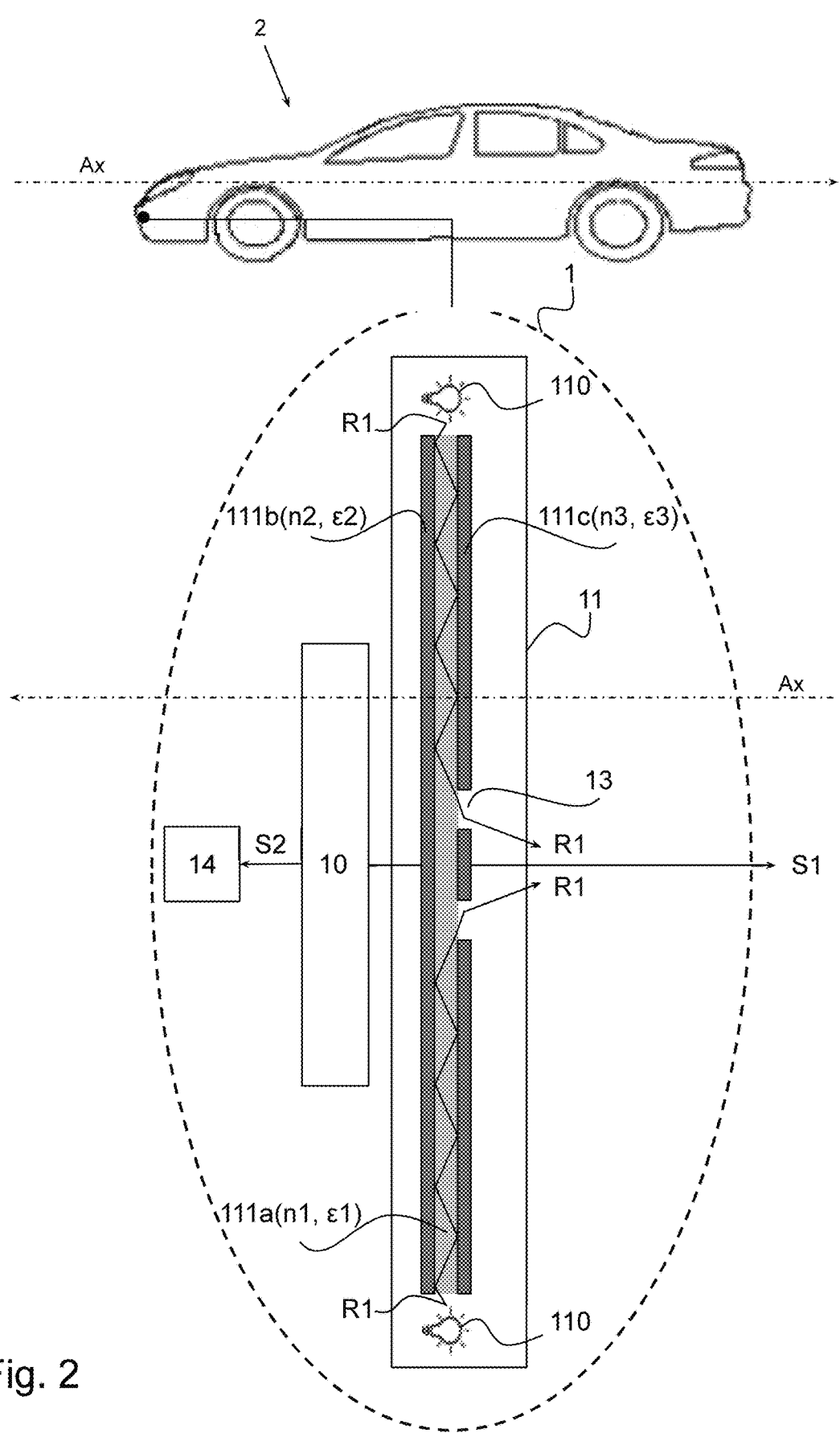
FIG. 2 is a schematic view of a radar detection system for a vehicle, the radar detection system comprising a radar sensor and a lighting element with at least one light source and a plurality of layers, according to one non-limiting embodiment of the invention.

As illustrated in FIG. 2, in one non-limiting embodiment, the radar detection system 1 is integrated behind the grille at the front of the motor vehicle 2. In another non-limiting embodiment, the radar detection system is integrated into the grille at the rear of the motor vehicle 2.

As illustrated in FIG. 2, the radar detection system 1 comprises:

a radar sensor 10, a lighting element 11.

Figure 1:
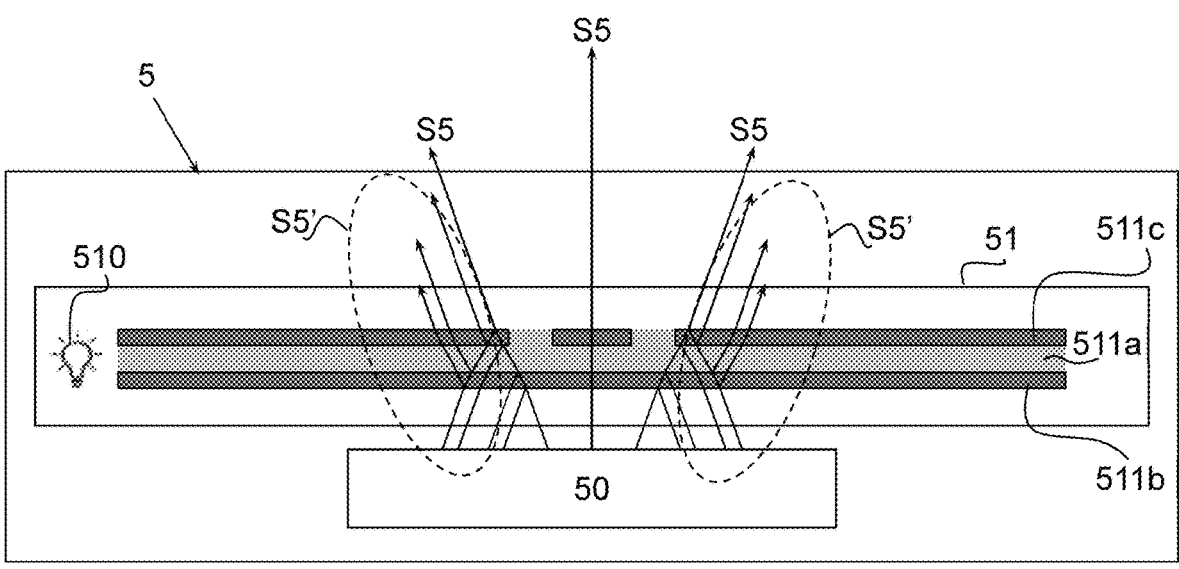
FIG. 1 is a schematic view of a radar detection system for a vehicle according to the prior art, the radar detection system comprising a radar sensor and a lighting element with at least one light source and a plurality of layers.
Figure 3:
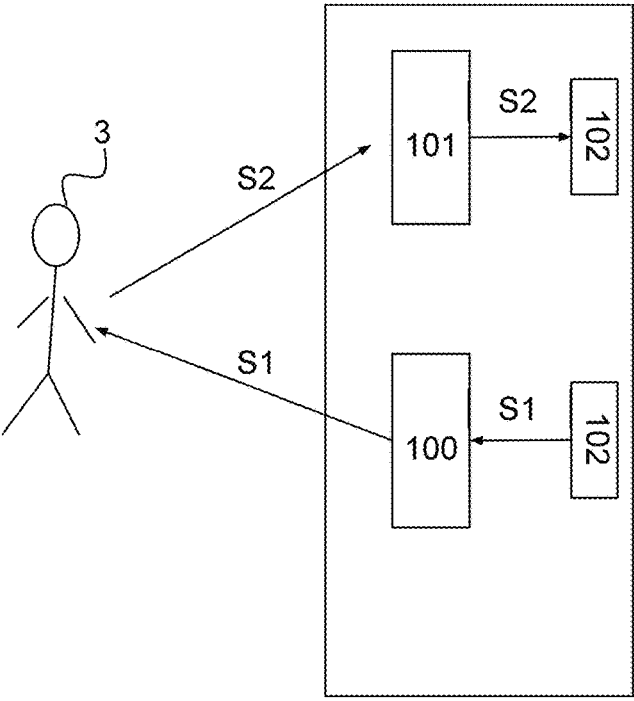
FIG. 3 is a schematic view of the radar sensor of the radar detection system from FIG. 2, according to one non-limiting embodiment.

In one non-limiting embodiment, the radar sensor 10 is a radar for detecting objects 3 (pedestrian, bicycle, vehicle, etc.) that are located in the environment outside the motor vehicle 2. One non-limiting example of an object 3 is illustrated in FIG. 3. This is a pedestrian in the non-limiting example. In one non-limiting embodiment, the radar sensor 10 is a millimeter-wave (between 24 GHz and 300 GHz) or very-high-frequency (between 300 MHz and 79 GHz) or microwave (between 1 GHz and 300 GHz) radar sensor. In one non-limiting variant embodiment, the radar sensor 10 operates at a radar frequency of between 76 and 81 GHz. The radar sensor 10 is configured to transmit/receive radar waves S1, S2.

As illustrated in FIG. 3, the radar sensor 10 comprises:

a transmitter 100 configured to generate a plurality of radar waves S1, otherwise called primary radar waves S1, a receiver 101 configured to process a plurality of radar waves S2, otherwise called secondary radar waves S2, multiple antennas 102.

In one non-limiting embodiment, a single electronic component may be used for both transmission and reception functions. There will thus be one or more transceivers. Said transmitter 100 is configured to generate primary radar waves S1, which, when they encounter an object 3 in the environment outside the vehicle 2, are reflected from (bounce off) said object 3. The radar waves thus reflected are waves that are transmitted back to the radar sensor 10. These are the secondary radar waves S2 that are received by the antennas 102 and processed by the receiver 101. In one non-limiting embodiment, the primary radar waves S1 and the secondary radar waves S2 are radiofrequency waves. Since the operation of a radar sensor 10 is known to those skilled in the art, it is not described in more detail here.

As illustrated in FIG. 2, in one non-limiting embodiment, the radar detection system 1 furthermore comprises an electronic control unit 14 configured to analyze the secondary radar waves S2 processed by the receiver 101 and to deduce therefrom whether there is an object 3 in the environment outside the motor vehicle 2. It will be noted that the analysis may also be carried out directly in the radar sensor 10 in another non-limiting embodiment.

As illustrated in FIG. 2, in one non-limiting embodiment, the radar sensor 10 is arranged facing said lighting element 11, centered on the lighting element 11. It is arranged behind the lighting element 11 along a through-axis Ax (otherwise called transverse axis) of the motor vehicle 2 that passes through the lighting element 11, said through-axis Ax extending in a direction opposite to the movement of the motor vehicle 2. In the non-limiting example taken from FIG. 2, the motor vehicle 2 is moving forward. In one non-limiting embodiment, the radar sensor 10 is fastened to the lighting element 11. In one non-limiting example, it is attached by way of fixing clips (not illustrated).

As illustrated in FIG. 2, the lighting element 11 comprises:

at least one light source 110, a plurality of layers 111 including a transparent layer 111*a*.

The light source 110 is configured to emit light rays R1, which are propagated by the transparent layer 111*a*. In one non-limiting embodiment, said at least one light source 110 is a semiconductor light source. In one non-limiting embodiment, said semiconductor light source forms part of a light-emitting diode. A light-emitting diode is understood to mean any type of light-emitting diode, be these, in non-limiting examples, LEDs ("Light Emitting Diodes"), OLEDs ("organic LEDs"), AMOLEDs (Active-Matrix-Organic LEDs) or even FOLEDs (Flexible OLEDs). In another non-limiting embodiment, said at least one light source 10 is a bulb with a filament. In one non-limiting embodiment illustrated in FIG. 2, the lighting element 11 comprises two light sources 110. This non-limiting embodiment is taken as a non-limiting example throughout the remainder of the description. In one non-limiting embodiment illustrated in FIG. 2, the two light sources 110 are arranged on either side of the lighting element 11. They are thus offset from the lighting element 11 and therefore from its various layers.

In one non-limiting embodiment, the transparent layer 111*a* is an optical element configured to propagate the light rays R1 from the two light sources 110 and direct them toward another layer 111*c*. In one non-limiting variant embodiment illustrated in FIG. 2, the transparent layer 111*a* is a light guide.

In one non-limiting embodiment, the transparent layer 111*a* is delimited by two layers 111 including a dark layer 111*b*. In one non-limiting embodiment, the other layer 111*c* that delimits the transparent layer 111*a* is a reflective layer. Thus, in one non-limiting embodiment, the transparent layer 111*a* is configured to propagate the light rays R1 from the two light sources 110 and project them through the reflective layer 111*c* and also to project them directly through the pattern 13 described further below if such a pattern 13 is present.

In one non-limiting embodiment, the dark layer 111*b* extends along the transparent layer 111*a* on the opposite side to the reflective layer 111*c*. The dark layer 111*b* is thus located behind the reflective layer 111*c* along the transverse axis Ax. The dark layer 111*b* is opaque or semi-opaque. In one non-limiting embodiment, the dark layer 111*b* is located facing the radar sensor 10. Said radar sensor is thus located behind the dark layer 111*b* along the transverse axis Ax. In a first non-limiting exemplary embodiment, the dark layer 111*b* is made of black polycarbonate. In a second non-limiting exemplary embodiment, the dark layer 111*b* is a dark paint that covers that side of the transparent layer 111*a* opposite the reflective layer 111*c*.

The reflective layer 111*c* is a layer visible to an observer from outside the motor vehicle 2. The reflective layer 111*c* is thus located in front of the transparent layer 111*a* along the transverse axis Ax. In one non-limiting embodiment, it extends along the transparent layer 111*a*. It is a light-reflecting layer. It makes it possible to obtain a mirror effect. In some non-limiting embodiments, the reflective layer 111*c* is made of indium, silicon oxide, titanium or any other reflective material. These materials make it possible to produce a reflective layer 111*c* that is thin enough for the radar waves S1, S2 from the radar sensor 10 to be able to pass through. In one non-limiting variant embodiment, the reflective layer 111c is composed of a stack of layers of said reflective material. This is the case for silicon oxide, in one non-limiting example.

Figure 4:
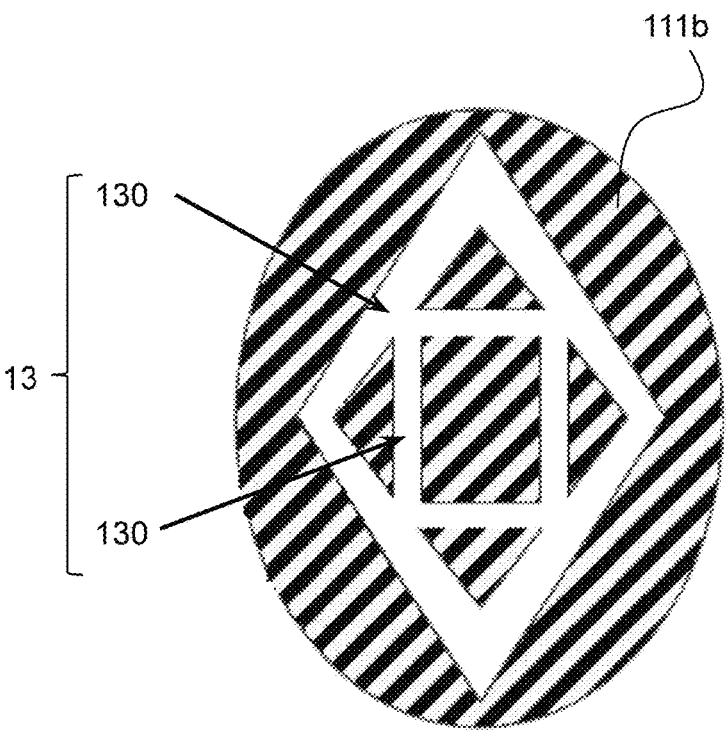
FIG. 4 is a schematic front-on view of a pattern produced in one of the layers of the lighting element of the radar detection system from FIG. 2, according to one non-limiting embodiment.

As illustrated in FIG. 4, in one non-limiting embodiment, the reflective layer 111c is configured to produce a pattern 13. In one non-limiting embodiment, the pattern 13 is produced by laser etching. When the pattern 13 is cut by laser etching, areas 130 are cut by laser etching in the reflective layer 111c. They allow the light rays R1 from the light sources 110 to pass. The pattern 13 makes it possible to have a light signature when the two light sources 110 are turned on. In one non-limiting embodiment, the pattern 13 is a logo. The signature is thus the logo of the manufacturer of the motor vehicle 2 in one non-limiting example. The radar sensor 10 is thus arranged behind the pattern 13 along the transverse axis Ax.

Figure 5:
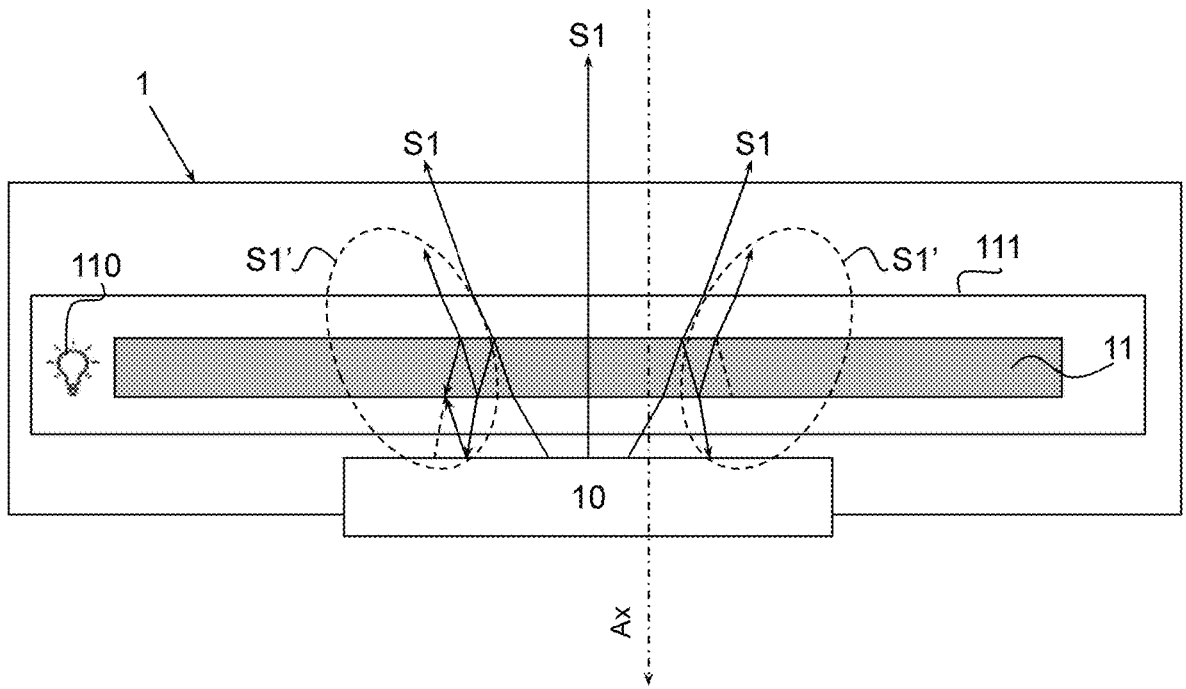
FIG. 5 is a schematic view of reflections of radar waves from the radar sensor from said plurality of layers of the lighting element of the radar detection system from FIG. 2, said plurality of layers being seen as a single layer by the radar waves passing through it and from which said radar waves are reflected, according to one non-limiting embodiment.

As illustrated in FIG. 5, the plurality of layers 111 is passed through by the radar waves S1 transmitted by the radar sensor 10. A portion of these radar waves S1 is reflected from said plurality of layers 111 and produces reflections S1', otherwise called parasitic reflections or parasitic waves. The plurality of layers 111 of the lighting element 11 have different light refractive indices n. Moreover, the plurality of layers 111 of the lighting element 11 have substantially equal dielectric permittivities ε.

The transparent layer 111a and the two layers that delimit it, namely the dark layer 111b and the reflective layer 111c in the non-limiting example taken, thus respectively have different light refractive indices n1, n2, n3. This makes it possible to reflect the light rays R1 from the light sources 110 and to direct them correctly to the desired location, here toward the layer visible from outside the motor vehicle 2, namely the reflective layer 111c in the non-limiting example taken.

The transparent layer 111a, the dark layer 111b and the reflective layer 111c, in the non-limiting example taken, thus respectively have substantially equal dielectric permittivities ε1, ε2, ε3. In one non-limiting embodiment, their dielectric permittivity ε1, ε2, ε3 is between 2.4 and 3.5. This makes it possible to substantially reduce the reflections of the transmitted radar waves S1. There will be fewer reflections, called parasitic reflections, that interfere with the transmission of said radar waves S1. The detection of an object 3 will therefore be more effective. As illustrated in FIG. 5, the plurality of layers 111a, 111b, 111c of the lighting element 11 is seen, by the transmitted radar waves S1, as a single layer 111, which is therefore passed through by said radar waves S1. There will therefore be only a series of reflections S1' from this layer. Indeed, since the layers 111a, 111b, 111c have substantially equal dielectric permittivities ε1, ε2, ε3, they are seen as the same medium by the radar waves S1. They will thus have the same propagation effect on the radar waves S1 without these radar waves S1 being disturbed by internal reflections that might be caused by discontinuities of dielectric permittivities. This thus eliminates discontinuities of dielectric permittivities.

As may be seen in FIG. 5, there is also a series of reflections S1' from the surface of the radar sensor 10. One portion of its reflections leave in the opposite direction to the direction of the transverse axis Ax, namely toward the outside of the motor vehicle 2, and the other portion is reflected again from the layer 111, considered to be single.

In order to obtain substantially equal dielectric permittivities ε1, ε2, ε3, in some non-limiting embodiments, the transparent layer 111a will be composed of transparent polycarbonate, the dark layer 111b will be composed of black polycarbonate, and the reflective layer 111c will be composed of indium-coated polycarbonate (thin layers of a few tens of nanometers in one non-limiting embodiment). For a given material and color, depending on the manufacturer and the manufacturing process, it is possible to find various dielectric permittivity values. Thus, in some non-limiting examples, for transparent polycarbonate, it is possible to have a dielectric permittivity ε1 of 2.5, 2.57 and 2.77. In some non-limiting examples, for black polycarbonate, it is possible to have a dielectric permittivity ε2 of 2.49, 2.57 and 2.95. In one non-limiting example, for indium-coated polycarbonate, it is possible to have a dielectric permittivity ε3 of 2.77. It should be noted that the thin indium layers do not significantly change the dielectric permittivity of the polycarbonate (thin layers with a thickness of nanometers).

In order to obtain substantially equal permittivities ε1, ε2, ε3, in one non-limiting embodiment, provision may be made to load the material with one or more layers 111 of polycarbonate microbeads, referenced PC, the material of which is denser. Thus, the denser the material of a layer, the more its dielectric permittivity 8 will increase.

It will be appreciated that the description of the invention is not limited to the embodiments described above and to the field described above. Thus, in another non-limiting embodiment, the transparent layer 111a is formed of prisms and/or microprisms. Thus, in another non-limiting embodiment, the transparent layer 111a may be delimited by two dark layers instead of one dark layer and one reflective layer. Thus, in another non-limiting embodiment, the plurality of layers 111 of the lighting element 11 may comprise more than three layers. Thus, in another non-limiting embodiment, the plurality of layers 111 may comprise at least one layer of air with the various layers other than said at least one layer of air of substantially equal dielectric permittivities. Thus, in one non-limiting variant embodiment, the transparent layer 111a is separated from the dark layer 111c by a layer of air, and/or from the reflective layer 111c by another layer of air. The number of reflections will decrease in comparison with a plurality of layers of different dielectric permittivities, including one or more layers of air of dielectric permittivity that is also different from the other layers. Thus, in another non-limiting embodiment, the two light sources 110 are arranged facing the dark layer 111b on a side opposite the reflective layer 111c. Thus, in another non-limiting embodiment, the radar detection system 1 is arranged in a lighting device of the vehicle 2. In some non-limiting examples, the lighting device is a headlight or a rear light. Thus, in one non-limiting embodiment, the radar sensor 10 comprises a plurality of transmitters 100 and a plurality of receivers 101.

The described invention thus in particular has the following advantages:

it makes it possible to reduce parasitic reflections of the radar waves S1 transmitted by the radar sensor 10 while continuing to propagate and direct the light rays R1 from said at least one light source 110; this thus reduces the disturbance of the transmitted radar waves S1 and the detection of an object 3 located in the environment outside of the vehicle 2 is more precise, it makes it possible, for a lighting element 11 with a plurality of layers, to have reflections substantially similar to a lighting element 11 that comprises only a single layer.

The invention claimed is:

1. A radar detection system for a vehicle, the radar detection system comprising:

a radar sensor configured to transmit/receive a plurality of radar waves, a lighting element arranged facing the radar sensor and including at least one light source configured to emit light rays, and a plurality of layers including a transparent layer configured to propagate the light rays with total internal reflection, wherein the layers have substantially equal dielectric permittivities, with the transparent layer being a light guide and having the light guide being between a dark layer and a reflective layer, the reflective layer configured to produce a pattern and wherein the dark layer is between the radar sensor and the light guide.

2. The radar detection system as claimed in claim 1, wherein the dielectric permittivities of the layers are between 2.4 and 3.5.

3. The radar detection system as claimed in claim 1, wherein the radar sensor is a millimeter-wave or very-high-frequency or microwave radar sensor.

4. The radar detection system as claimed in claim 3, wherein the radar sensor operates at a radar frequency of between 76 GHz and 81 GHz.

* * * * *